US010038555B2

(12) United States Patent
Atherton

(10) Patent No.: US 10,038,555 B2
(45) Date of Patent: Jul. 31, 2018

(54) BIOMETRIC AUTHENTICATION SYSTEM

(71) Applicant: MIKOH Corporation, McLean, VA (US)

(72) Inventor: Peter Samuel Atherton, Leesburg, VA (US)

(73) Assignee: MIKOH CORPORATION, McLean, VA (US)

(*) Notice: Subject to any disclaimer, the term of this patent is extended or adjusted under 35 U.S.C. 154(b) by 0 days.

(21) Appl. No.: 14/385,284

(22) PCT Filed: Mar. 15, 2013

(86) PCT No.: PCT/AU2013/000266
§ 371 (c)(1),
(2) Date: Sep. 15, 2014

(87) PCT Pub. No.: WO2013/134832
PCT Pub. Date: Sep. 19, 2013

(65) Prior Publication Data
US 2015/0046707 A1 Feb. 12, 2015

Related U.S. Application Data

(60) Provisional application No. 61/611,438, filed on Mar. 15, 2012.

(51) Int. Cl.
G06Q 20/02 (2012.01)
H04L 9/08 (2006.01)
(Continued)

(52) U.S. Cl.
CPC ............ H04L 9/0866 (2013.01); G06F 21/32 (2013.01); G06Q 20/02 (2013.01);
(Continued)

(58) Field of Classification Search
CPC ..... H04L 9/08; H04L 9/0866; H04L 63/0861; H04L 9/3231; H04L 9/3247;
(Continued)

(56) References Cited

U.S. PATENT DOCUMENTS 5,010,485 A * 4/1991 Bigari ................. G06Q 20/04
235/379
6,047,268 A * 4/2000 Bartoli ................. G06Q 20/02
705/35

(Continued)

FOREIGN PATENT DOCUMENTS

| WO | WO 02/23796 A1 | 3/2002 |
| WO | WO 2004/006076 A2 | 1/2004 |
| WO | 2010132928 A1 | 11/2010 |

OTHER PUBLICATIONS

Extended European Search Report dated Nov. 15, 2015, by the European Patent Office in corresponding European Patent Application No. 13760601.8. (7 pages).
(Continued)

Primary Examiner — Abu Sholeman
(74) Attorney, Agent, or Firm — Buchanan Ingersoll & Rooney PC

(57) ABSTRACT

In a system and method of completing a transaction over a network, a personal electronic device (PED) receives transaction information; captures biometric information from the PED user; and uses such information to identify if the user is an authorized user of the PED. If the captured biometric information identifies an authorized user of the PED, the PED: enables a first one of a pair of cryptographic keys stored on the PED corresponding to the identified authorized user; generates a digital signature for the transaction using the enabled first key; generates an authenticated transaction request using the received transaction information; and transmits the authenticated transaction request to a transac-
(Continued)

tion approval center via the network. The transaction approval center uses the authenticated transaction request to complete the transaction; and the PED receives confirmation regarding the transaction from the transaction approval center.

8 Claims, 9 Drawing Sheets

(51) Int. Cl.
*H04L 9/32* (2006.01)
*H04L 29/06* (2006.01)
*G06F 21/32* (2013.01)
*G06Q 20/32* (2012.01)
*G06Q 20/38* (2012.01)
*G06Q 20/40* (2012.01)

(52) U.S. Cl.
CPC ..... *G06Q 20/3227* (2013.01); *G06Q 20/3825* (2013.01); *G06Q 20/40145* (2013.01); *H04L 9/3231* (2013.01); *H04L 9/3247* (2013.01); *H04L 63/0861* (2013.01); *H04L 2209/24* (2013.01)

(58) Field of Classification Search
CPC ............... H04L 2209/24; G06F 21/32; G06Q 20/40145; G06Q 20/3227; G06Q 20/02; G06Q 20/3825
USPC ........................................ 713/1, 168; 705/75
See application file for complete search history.

(56) References Cited

U.S. PATENT DOCUMENTS

| | | | |
|---|---|---|---|
| 6,678,821 B1 | 1/2004 | Waugh et al. | |
| 7,177,838 B1* | 2/2007 | Ling | G06Q 20/06 705/41 |
| 7,689,832 B2 | 3/2010 | Talmor et al. | |
| 7,702,536 B1* | 4/2010 | Alabraba | G06Q 30/02 705/14.16 |
| 8,788,945 B1* | 7/2014 | Jesensky | G06Q 20/40 705/35 |
| 8,988,192 B2* | 3/2015 | King | G06F 21/32 340/5.82 |
| 2002/0104006 A1 | 8/2002 | Boate et al. | |
| 2002/0161723 A1* | 10/2002 | Asokan | G06Q 20/02 705/67 |
| 2002/0186845 A1* | 12/2002 | Dutta | G06Q 20/32 380/247 |
| 2003/0014629 A1* | 1/2003 | Zuccherato | H04L 9/3268 713/156 |
| 2003/0120611 A1* | 6/2003 | Yoshino | G06F 21/10 705/67 |
| 2003/0140011 A1* | 7/2003 | Ishimi | G06Q 10/087 705/76 |
| 2004/0059924 A1* | 3/2004 | Soto | G06F 21/32 713/186 |
| 2004/0139329 A1* | 7/2004 | Abdallah | H04L 9/3231 713/182 |
| 2004/0266523 A1* | 12/2004 | Gentles | G07F 17/323 463/29 |
| 2005/0184145 A1* | 8/2005 | Law | G06Q 20/0855 235/380 |
| 2005/0246763 A1 | 11/2005 | Corcoran et al. | |
| 2007/0136198 A1* | 6/2007 | Foth | G06Q 20/40 705/44 |
| 2007/0198432 A1* | 8/2007 | Pitroda | G06Q 20/02 705/64 |
| 2008/0061967 A1* | 3/2008 | Corrado | G06K 7/10079 340/539.26 |
| 2008/0114678 A1* | 5/2008 | Bennett | G06Q 20/04 705/44 |
| 2008/0147559 A1* | 6/2008 | Cohen | G06Q 20/145 705/59 |
| 2008/0148393 A1* | 6/2008 | Wendt | G06F 21/32 726/19 |
| 2008/0222049 A1* | 9/2008 | Loomis | G06Q 20/10 705/75 |
| 2009/0235068 A1* | 9/2009 | Song | H04L 9/3263 713/156 |
| 2011/0145093 A1* | 6/2011 | Paradise | G06Q 30/02 705/26.41 |
| 2011/0213709 A1* | 9/2011 | Newman | G06F 21/32 705/44 |
| 2012/0124224 A1* | 5/2012 | Raboin | H04L 67/10 709/228 |
| 2012/0150750 A1* | 6/2012 | Law | G06Q 20/20 705/76 |
| 2012/0157062 A1* | 6/2012 | Kim | G06Q 30/0601 455/414.1 |
| 2012/0214443 A1* | 8/2012 | Daigle | H04L 9/3228 455/411 |
| 2012/0303476 A1* | 11/2012 | Krzyzanowski | G06F 8/60 705/26.5 |
| 2012/0316992 A1* | 12/2012 | Oborne | G06Q 30/06 705/26.41 |
| 2013/0046697 A1* | 2/2013 | Schibuk | G06Q 20/32 705/67 |
| 2013/0069431 A1* | 3/2013 | Tseng | H02J 7/0044 307/43 |
| 2013/0282582 A1* | 10/2013 | Pereira | G06Q 20/12 705/44 |
| 2015/0046707 A1* | 2/2015 | Atherton | H04L 9/3231 713/168 |

OTHER PUBLICATIONS

International Search Report (PCT/ISA/210) dated May 9, 2013, by the Australian Patent Office as the International Searching Authority for International Application No. PCT/AU2012/000266.

* cited by examiner

BIOMETRIC AUTHENTICATION SYSTEM

FIELD

The present invention relates to the biometric authentication of transactions—in particular, financial transactions—over a network such as the internet.

BACKGROUND

Biometric identification of an individual over a network such as the internet currently requires that the individual's biometric templates be stored in a database on the network. Such a database therefore stores biometric templates for all users of the biometric identification system.

A major disadvantage of such a configuration is that if the database is hacked the biometric data for all users is compromised. Biometric data cannot be revoked and re-issued, since it is inherently permanent. This disadvantage therefore results in privacy and security concerns that present a significant impediment to the adoption of biometrics over the internet.

Object

An objective of the present invention is to overcome or substantially ameliorate at least one disadvantage described above.

SUMMARY

The invention described herein is presented in the particular context of biometrically authenticated product purchases over a network, but can be applied to biometric authentication of any type of transaction.

A first aspect of the present disclosure provides completing a transaction over a network, said method comprising: receiving transaction information by a personal electronic device (PED); capturing biometric information from a user by the PED; using the captured biometric information, by the PED, to identify if the user is an authorized user of the PED; and if the captured biometric information identifies an authorized user of the PED, the PED performing the steps of: enabling a first one of a pair of cryptographic keys stored on the PED, said pair of cryptographic keys corresponding to the identified authorized user; generating a digital signature for the transaction using the enabled first key; generating an authenticated transaction request using the received transaction information, the authenticated transaction request comprising at least the received transaction information, the digital signature and information identifying the authorized user such as the second key of the pair of cryptographic keys; transmitting the authenticated transaction request to a transaction approval center via the network, the transaction approval center using the authenticated transaction data request to complete the transaction; and receiving confirmation regarding the transaction from the transaction approval center.

A further aspect of the present disclosure provides a computer-readable medium having a program recorded thereon, where the program is configured to make a computer execute the method of the first aspect.

A yet further aspect of the present disclosure provides a system to complete a transaction over a network, said system comprising:

a transaction approval center; and a personal electronic device (PED), the PED being configured to: receive transaction information; capture biometric information from a user of the PED; use the captured biometric information to identify if the user is an authorized user of the PED; and if the captured biometric information identifies an authorized user of the PED, perform the steps of: enabling a first one of a pair of cryptographic keys stored on the PED, said pair of cryptographic keys corresponding to the identified authorized user; generating a digital signature for the transaction using the enabled first key; generating an authenticated transaction request using the received transaction data, the authenticated transaction request comprising at least the received transaction information, the digital signature and information identifying the authorized user such as the second key of the pair of cryptographic keys; transmitting the authenticated transaction request to the transaction approval center via the network; and receiving confirmation regarding the transaction from the transaction approval center; wherein the transaction approval center uses the authenticated transaction data request to complete the transaction.

BRIEF DESCRIPTION OF THE DRAWINGS

Preferred embodiments of the present disclosure will now be described by way of non-limiting example with reference to the schematic illustrations of FIGS. 1 to 6, wherein.

With regard to the figures, it should be noted that numeric identifiers that appear in multiple figures have the same meaning throughout. For example, the numeric identifier 100 has the same meaning in FIGS. 1 to 8.

The present disclosure provides a system that enables biometric authentication of transactions—a particular example being financial transactions—over a network such as the internet without any biometric data being released into the network.

DETAILED DESCRIPTION OF THE PREFERRED EMBODIMENTS

Introduction

A network-based system for biometrically authenticating commercial transactions is described. The system may operate over the internet, or over a cell phone network, or over some other network—or may operate over a combination of networks, such as a combination of the internet and one or more cell phone networks.

A particular embodiment of the present invention is a network-based system for enabling consumers to make biometrically-authenticated in-store or online purchases of consumer products by means of a personal electronic device (PED) such as (without limitation) a "smartphone" (an intelligent cell phone with internet access), a tablet, or a laptop computer.

At present such purchases would most usually be made using a credit card. The present invention therefore presents an opportunity to dispense with credit cards and instead biometrically identify the consumer as the originator of a product purchase. Alternatively, the present invention may be used to augment the security of credit card based transactions.

Since biometric identification, if properly implemented, is a highly secure means of identifying individuals, the present invention provides an opportunity to substantially reduce the incidence of credit card fraud by replacing or augmenting credit cards with the biometric authentication system described herein. Furthermore, the biometric system described herein does not carry the privacy and security risks associated with conventional network-based biometrics, since in the present invention no biometric data is ever released into the network—not even during the enrollment process.

In the embodiments described herein a smartphone is used as the preferred personal electronic device, but it should be appreciated that a different type of personal electronic device—such as a tablet or a laptop computer or some other personal electronic device (PED)—could be used instead.

Figure 1:
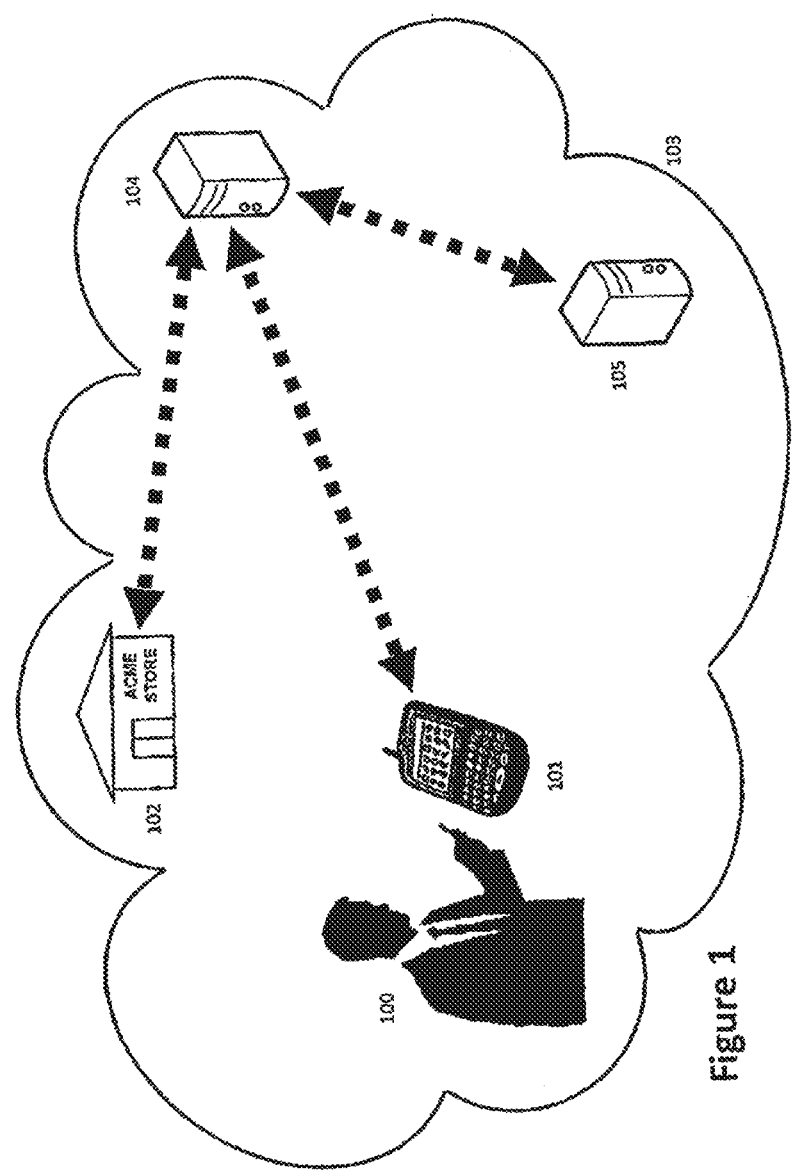
FIG. 1 is a schematic illustration of a network and the network elements involved in a biometric authentication system.

A non-limiting example of a biometric authentication system that is the subject of the present invention is described in the following and illustrated schematically in overview in FIG. 1. It should be appreciated that the following description (relating to FIG. 1) is an overview of the key operational aspects only, and that further details of the system operation are provided in relation to FIGS. 2 to 6. In the example of FIG. 1 a consumer 100 uses a smartphone 101 to purchase products either in-store or online from a merchant 102. The purchase is authenticated and completed by means of communications over a network 103 such as the internet, a cell phone network, or some other network, or a combination of different network types. The key steps are as follows.

1. The consumer 100 selects products to be purchased from the merchant 102.
2. Information detailing the proposed purchase is presented at the consumer's smartphone 101. (This information may be captured or obtained by the smartphone 101 via one of a number of methods, as described herein.)
3. The consumer 100 reviews the proposed purchase and, if acceptable, provides biometric authorization (described herein), via the smartphone 101, for the purchase to proceed.
4. The consumer's biometrically authenticated purchase request is communicated from the smartphone 101 via the network 103 to a Transaction Approval Center 104, where the purchase is reviewed and approved (or refused, if not valid) by the relevant commercial institution(s). The Transaction Approval Center 104 is presented herein as a single server on the network 103 but in reality may comprise a number of interconnected organizations, such as an acquiring bank and an issuing bank or institution, that communicate with the merchant 102 and with the consumer's smartphone 101 by means of one or more network servers. The consumer's biometrically authenticated purchase request is verified at the Transaction Approval Center 104 by means of the consumer's public cryptographic keys (as described herein), which are obtained from a public key server 105 also on the network 103.
5. If the purchase is approved, the Transaction Approval Center 104 communicates approval for the purchase back to the consumer's smartphone 101 and also to the merchant 102, who then proceeds to release the purchased products to the consumer 101.

Figure 7:
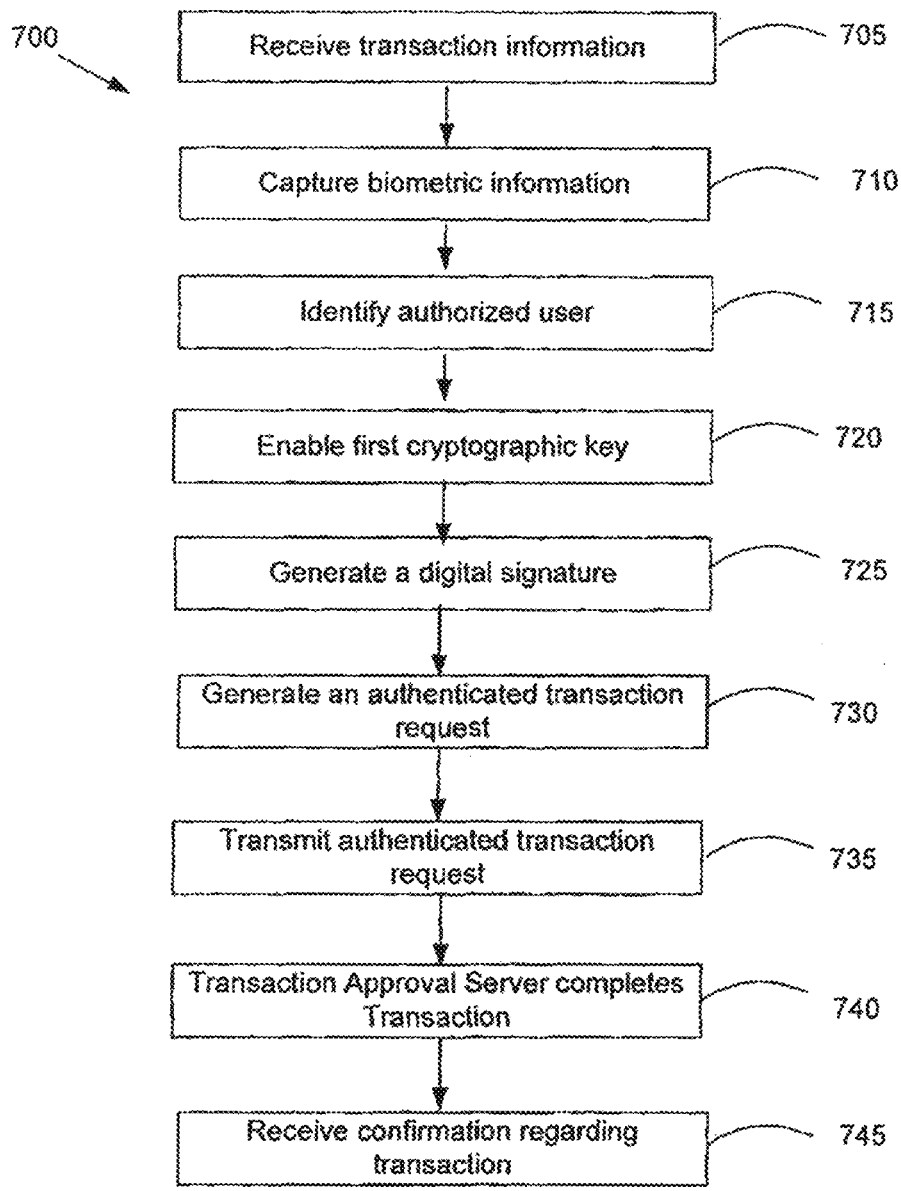
FIG. 7 is a flowchart of completion of a transaction using a biometric authentication system.

An example method 700 of completing a transaction using the example of FIG. 1 is illustrated in FIG. 7. The method 700 starts at step 705, when the smartphone 101 receives transaction information. The transaction information may, for example, be the information detailing the proposed purchase discussed hereinbefore. At step 710, the smartphone 101 captures biometric information. The captured biometric information is used to identify if the user is an authorized user of the smartphone 101 at step 715 of the method 700. Upon identifying an authorized user, a first one of a pair of cryptographic keys corresponding to the identified authorized user is enabled by the smartphone 101 at step 720. The enabled first cryptographic key is used by the smartphone 101 to generate a digital signature for the transaction in step 725. An authenticated transaction request is generated by the smartphone 101 at step 730. The authenticated transaction request may comprise the received transaction information, the digital signature, and information identifying the authorized user such as the second of the pair of cryptographic keys. The authenticated transaction request is transmitted by the smartphone 101 to the Transaction Approval Center 104 in step 735. The Transaction Approval Center 104 uses the authenticated transaction request to complete the transaction at step 740. The method 700 ends upon the smartphone 101 receiving confirmation regarding the transaction at step 745.

The steps of the method 700 are described in further detail hereinafter in relation to FIGS. 1-6.

It should be appreciated that the term "a pair of cryptographic keys" as used herein refers to two related cryptographic keys, wherein one of the keys can be used to perform an encryption operation and the other of the keys can be used to perform the corresponding decryption operation. Usually one of the keys is kept secret (the private key) while the other key is made public (the public key), and the key pair is known as a public/private key pair.

Biometric Authorization of a Commercial Transaction

The biometric authorization process as it relates to a product purchase is now described in more detail and illustrated schematically in FIGS. 2 to 5. This process is used in each of the preferred embodiments described herein. The following description presents the essential aspects of a typical biometric authorization process, but it should be appreciated that numerous variations on the basic process are possible.

It should also be appreciated that the biometric authorization process described herein may be used in conjunction with other techniques for identifying the consumer 100 in a so-called multi-factor authentication process. For example, the biometric authorization process described herein may be used in combination with a user password that a consumer must provide at the time of purchase, and/or a screen pattern that a consumer must enter at the time of purchase, and/or a token (such as a smartcard) that a consumer must present at the time of purchase.

The purpose of the biometric authorization process is to biometrically associate the consumer 100 with each product purchase made by the consumer 100. Biometric authorization by the consumer 100 of a product purchase results in a biometrically authenticated product purchase request (including, among other things, the biometrically confirmed identity of the consumer 100 and details of the proposed purchase) being transferred over the network 103 to the Transaction Approval Center 104. The Transaction Approval Center 104 verifies the consumer's identity and determines whether the consumer 100 is approved to make the purchase (in terms of available credit, credit history, etc.). The Transaction Approval Center 104 then provides approval to the merchant 102 to proceed—or refuses the transaction if the consumer 100 is not approved to make the proposed purchase.

An advantage of the present invention is that biometric identification of the consumer 100 can be conveyed to the Transaction Approval Center 104 without any of the consumer's biometric information leaving the consumer's smartphone 101. To facilitate this, the smartphone 101 incorporates a biometric/cryptographic ("bio/crypto") module 201, as illustrated schematically in FIG. 2. The bio/crypto module 201 incorporates a biometric recognition engine and certain cryptographic capabilities (neither of which is shown explicitly in FIG. 2), which two functions act cooperatively as described herein.

The purpose of the bio/crypto module 201 is to undertake biometric identification of a consumer 100 locally in the smartphone and to "convert" successful biometric identification of the consumer 100—who at that point is referred to as an authorized consumer 100—into a cryptographic operation that can be verified remotely by another device or person on the network 103.

The bio/crypto module 201 may be either a hardware or software module. For example, in one embodiment the bio/crypto module 201 may be a software program loaded onto the smartphone 101; in another embodiment the bio/crypto module 201 may be a plug-in module that is plugged into a port on the smartphone 101; in another embodiment the bio/crypto module 201 may be electronics incorporated into the smartphone 101; and in another embodiment the bio/crypto module 201 may be a separate module that communicates wirelessly with the smartphone 101.

The bio/crypto module 201 securely stores biometric templates for one or more enrolled users—referred to herein as authorized consumers. The term biometric template, as used herein, refers to information or data that is based on, or derived from, biometric information gathered from an authorized consumer and that is used to biometrically identify said authorized consumer. These biometric templates are recorded by the bio/crypto module 201 during the consumer enrollment process and are stored in the bio/crypto module 201 but nowhere else. Specifically, the biometric templates are never at any time released by the bio/crypto module 201 into the network 103 or to any other device.

For each authorized consumer 100 the bio/crypto module 201 internally generates one or more public/private cryptographic key pairs that it associates with biometric identification of said authorized consumer 100. Preferably generation of the public/private key pairs will be independent of any biometric information. In one preferred embodiment the bio/crypto module 201 may generate internally and associate with each authorized consumer 100 a first unique public/private key pair with a private encryption key and a public decryption key (for generating and verifying digital signatures), and a second unique public/private key pair with a public encryption key and a private decryption key (for securing information sent to the bio/crypto module 201).

Securing information sent to the bio/crypto module 201 may involve encrypting the information sent to the bio/crypto module 201. In a specific preferred embodiment the bio/crypto module 201 may generate internally and associate with each authorized consumer 100 a unique public/private key pair with a private encryption key 202a and a public decryption key 202b, for generating and verifying digital signatures (respectively), as illustrated schematically in FIG. 2. A cryptographic key generated by a bio/crypto module 201 and associated with biometric identification of an authorized consumer 100 will be referred to herein as a bio-key of said authorized consumer 100.

All private bio-keys generated by a bio/crypto module 201 are retained secretly and securely within the bio/crypto module 201 and are disabled in their default state—i.e. are unavailable for use by the bio/crypto module 201 in their default state. Said private bio-keys are preferably never released by the bio-crypto module 201.

Figure 2:
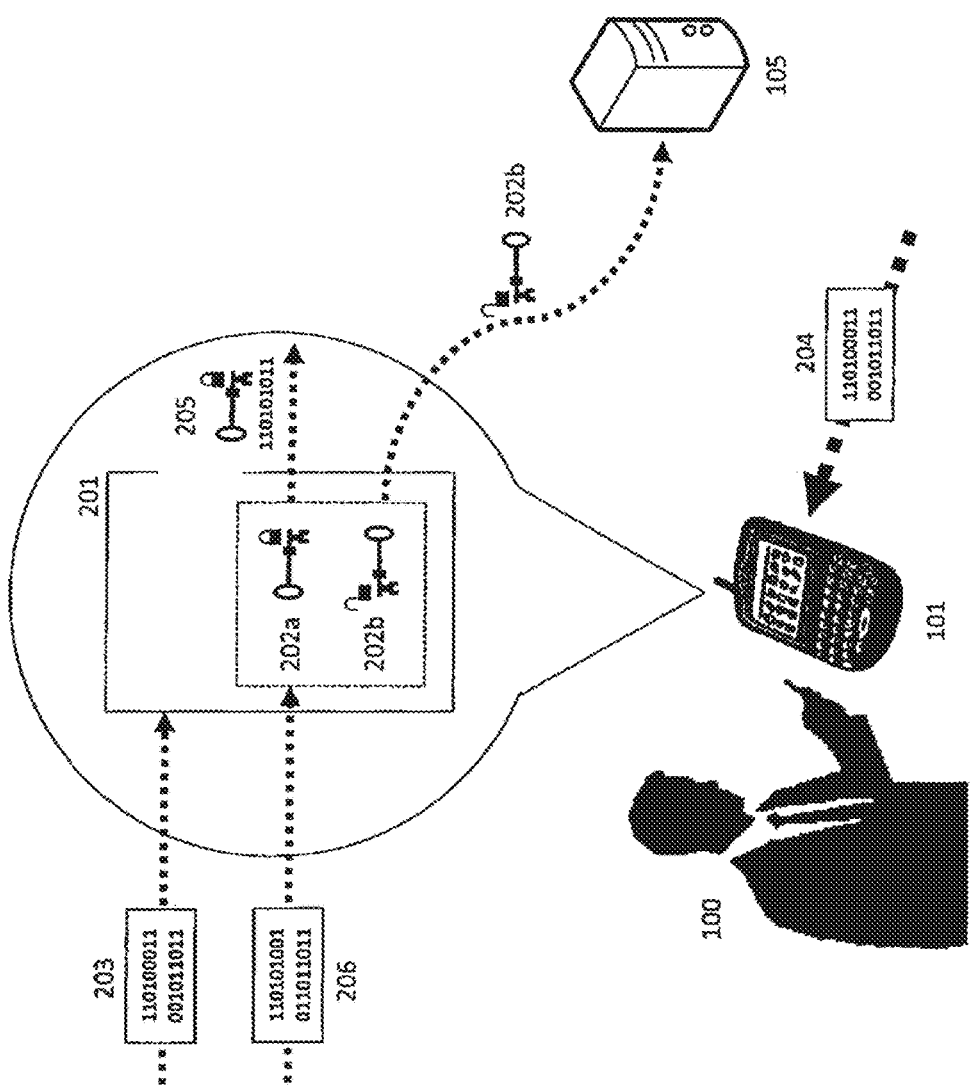
FIG. 2 is a schematic illustration of some aspects of the biometric authorization process.

The corresponding public bio-keys generated by a bio/crypto module 201 and the authorized consumer's personal details (for example name, address, etc) are securely uploaded to the public key server 105. The public bio-keys and some or all of the corresponding authorized consumer's personal details are generally available to any device that connects to the public key server 105. FIG. 2 schematically illustrates the public decryption bio-key 202b for authorized consumer 100 being uploaded to the public key server 105.

In some preferred embodiments, but not necessarily, the bio/crypto module 201 may secretly and securely store an authorized consumer's personal details in conjunction with said authorized consumer's private bio-keys. Whether or not these personal details are also stored (in addition to the bio-keys) may in some embodiments be at the discretion of each authorized consumer 100.

Biometric authorization is required for each biometrically authenticated product purchase. Biometric authorization of a product purchase involves the authorized consumer 100 providing biometric authorization for a specific cryptographic operation that is associated with the product purchase. More specifically, biometric authorization requires biometric identification of the authorized consumer 100 as a precondition to undertaking the specific cryptographic operation that biometrically authenticates the product purchase.

Biometric authorization of a product purchase therefore requires an authorized consumer 100 to provide biometric data to the smartphone 101 in conjunction with an instruction to proceed with said product purchase. Said providing of biometric data and said instruction to proceed may be two separate actions or may be combined into a single action undertaken by the authorized consumer.

If the bio/crypto module 201 biometrically identifies the authorized consumer 100 (based on a comparison of live biometric data gathered by the smartphone 101 with biometric template data stored in the bio/crypto module 201) it will then enable the relevant private bio-key of the biometrically identified authorized consumer 100 in order to perform the specific cryptographic operation associated with the product purchase. The private bio-key will be enabled only in order to perform the specific cryptographic operation and for no other purpose—it will otherwise remain disabled.

In one preferred embodiment, biometric authentication of a product purchase made by authorized consumer 100 involves generating a digital signature using the private encryption bio-key 202a of authorized consumer 100. In this case the authorized consumer's private encryption bio-key 202a will be enabled (provided the authorized consumer 100 is biometrically identified by the bio/crypto module 201) in order to generate the digital signature but for no other purpose—i.e. the private encryption bio-key 202a will otherwise remain disabled.

Use of the private bio-key 202a by the bio/crypto module 201 is therefore equivalent to biometric identification of authorized consumer 100, since each use of the private bio-key 202a requires biometric identification of authorized consumer 100 (with whom the private bio-key 202a is associated).

Use of the private bio-key 202a corresponding to authorized consumer 100 in a specific cryptographic operation can be confirmed by a remote device or person that receives the output of the specific cryptographic operation, said confirmation being possible through the use of the corresponding public bio-key 202b for authorized consumer 100, which public bio-key 202b is available from the public key server 105. The remote device or person is therefore able to biometrically identify the authorized consumer 100 as the originator of the specific cryptographic operation. It should be noted that no biometric information is released into the network 103 in the course of said biometric identification process.

The smartphone 101 provides a means for an authorized consumer 100 to initiate biometric authorization of a product purchase. In one embodiment this means may be a touch screen button that appears on the smartphone touch screen at an appropriate point during the purchase procedure. It should be appreciated, however, that other means to initiate a biometrically authenticated product purchase may be employed instead, including without limitation:
  voice activation;
  gesture recognition—for example hand or eyeball gesture recognition.

Biometric authorization of a product purchase by an authorized consumer 100 does several things:
  it identifies the product purchase to be undertaken;
  it identifies a specific cryptographic operation that will be used to biometrically authenticate the purchase;
  it initiates biometric identification of the consumer 100 as an authorized consumer 100 in order to enable the authorized consumer's private bio-key that will be used to carry out the specific cryptographic operation;
  it causes (initiates) the preparation of a purchase data bundle (described below) that includes the output of the specific cryptographic operation, said purchase data bundle then being transmitted to the Transaction Approval Center 104.

In the preferred embodiments described herein the specific cryptographic operation used in the biometric authentication process is the generation of a digital signature using the private encryption bio-key 202a of the authorized consumer 100.

Immediately a consumer 100 provides biometric authorization for a product purchase the smartphone 101 will attempt to capture biometric data 203 from the consumer 100 in order to biometrically identify the consumer 100 as authorized consumer 100. Preferably, but not necessarily, the smartphone 101 will use an existing integrated sensor to gather the biometric data 203. For example, the smartphone's camera may be used to capture an image for iris or facial recognition, or the smartphone's microphone may be used to capture audio for voice recognition, or the smartphone's touchscreen may be used to capture fingerprint data or a partial hand print, etc. In some embodiments a combination of biometric identification methods—for example, iris plus voice recognition—may be used to biometrically identify the consumer 100 as authorized consumer 100. As described above, in some embodiments capture of the biometric data 203 may involve a separate action by the consumer 100 from the action of initiating biometric authorization, while in some other embodiments the two actions may be combined into a single action so that in said single action the consumer 100 can both initiate biometric authorization and provide biometric data 203.

The captured biometric data 203 is transferred to the smartphone's bio/crypto module 201 (as illustrated schematically in FIG. 2) and used to biometrically identify the consumer 100 by comparing the captured live biometric data 203 with one or more biometric templates stored in the bio/crypto module 201. If the consumer 100 is biometrically identified as authorized consumer 100, the purchase process continues. If not, the purchase process stops. It is assumed here that the consumer 100 is biometrically identified as authorized consumer 100. In this case the bio/crypto module 201 enables the authorized consumer's private encryption bio-key 202a for use in generating a digital signature associated with the product purchase, but for no other purpose.

A preferred sequence of events in biometrically authenticating a product purchase may therefore in one embodiment be as follows:
  Information 204 describing the proposed product purchase is made available to the smartphone 101 and presented to the consumer 100 on the smartphone 100. How the information 204 may be made available to the smartphone 101 is described in more detail below.
  The consumer 100 reviews the proposed product purchase, as described by the information 204.
  The consumer 100 provides biometric authorization for the product purchase—for example, by touching an appropriate button on the smartphone's touch screen.
  The smartphone 101 gathers live biometric data 203 from the consumer 100, which biometric data 203 is input to the bio/crypto module 201.
  The bio/crypto module 201 in the consumer's smartphone 101 uses the live biometric data 203 to biometrically identify the consumer 100 as authorized consumer 100. Preferably, it does this by comparing the live biometric data 203 with biometric template data stored securely in the bio/crypto module 201.
  Optionally, the smartphone 101 may present a confirmation screen to the authorized consumer 100, providing (again) details of the proposed purchase. The authorized consumer 100 then has an opportunity to confirm either that the purchase should proceed or that it should be aborted. In some embodiments the details of the proposed purchase may be displayed along with the identity of the authorized consumer 100 as determined biometrically by the bio/crypto module 201—assuming that the bio/crypto module 201 stores personal information in conjunction with each authorized consumer's biometric templates and/or bio-keys. In one embodiment the authorized consumer 100 may at this point be required to input one or more additional forms of authentication, such as for example a personal identification number and/or a touch-screen swipe pattern, in order for the purchase to proceed.
  The bio/crypto module 201 enables the authorized consumer's private encryption bio-key 202a for use in the generation of a digital signature 205 corresponding to the product purchase that the authorized consumer 100 has biometrically authorized—the private encryption bio-key 202a is not enabled for any other purpose, and otherwise remains disabled. The digital signature 205 is derived from, and corresponds to, information 206 relating to the product purchase, said information 206 being input to the bio/crypto module 201 from the smartphone 101. The information 206 relating to a biometrically authenticated product purchase is known herein as a purchase data packet. The digital signature 205 enables biometric authentication by a remote device, such as the Transaction Approval Center 104, of the product purchase.

In a simple variation on the above described preferred sequence, the consumer 100 may be required to enter one or more non-biometric forms of authentication prior to providing biometric authorization for the proposed product purchase to proceed. For example, the consumer 100 may be required to input a personal identification number and/or a touch-screen swipe pattern. The purpose of this non-biometric authentication is to identify an authorized consumer 100 and indicate to the bio/crypto module 201 which of the enrolled authorized consumers should be biometrically identified by the bio/crypto module 201 as part of the subsequent biometric authorization process.

Figure 3:
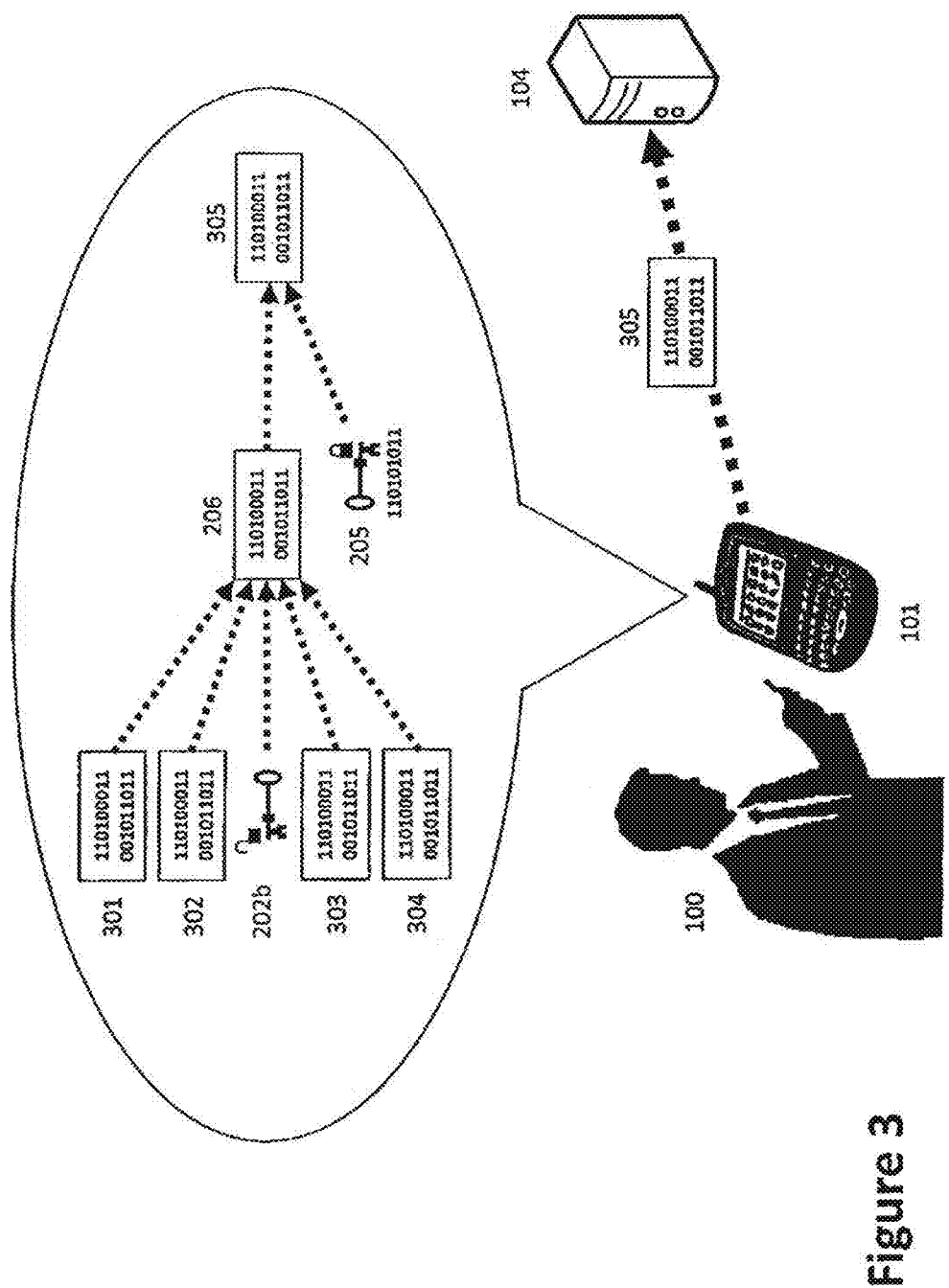
FIG. 3 is a schematic illustration of the preparation of a biometrically authenticated product purchase request.

As illustrated schematically in FIG. 3, the smartphone 101 constructs the purchase data packet 206 from various types of information pertaining to the proposed purchase. In the embodiment of FIG. 3 (which is just one non-limiting example) the smartphone 101 constructs the purchase data packet 206 from the following:

purchase details 301, including specifications for products to be purchased and prices;

merchant details 302, optionally including a "respond-to" address for purchase approval from the Transaction Approval Center 104;

public decryption bio-key 202b or other information corresponding to the authorized consumer 100, to identify the purchaser to the Transaction Approval Center 104;

(optionally) authorized consumer details 303, if these are stored in the authorized consumer's bio/crypto module 201;

date and time of purchase —304.

The purchase data packet 206 and digital signature 205 are bundled together into a purchase data bundle 305.

The purchase data bundle 305 is transmitted via the network 103 to the Transaction Approval Center 104. Transmission of the purchase data bundle 305 may be secured using standard security methods such as, for example, SSL (Secure Sockets Layer), TLS (Transport Layer Security), and/or PKI (Public Key Infrastructure). In the case of PKI, the purchase data bundle 305 may be encrypted using a public encryption key for the Transaction Approval Center 104, with the corresponding private decryption key being retained secretly and securely by the Transaction Approval Center 104.

The Transaction Approval Center 104 receives and processes the purchase data bundle 305. A non-limiting example of a method for processing the purchase data bundle is described below and illustrated schematically in FIG. 4.

The Transaction Approval Center 104 receives the purchase data bundle 305 and reads the public decryption bio-key 202b included in the purchase data packet 206.

The Transaction Approval Center 104 communicates with the public key server 105 in order to (i) verify the public decryption bio-key 202b included in the purchase data packet 206, and (ii) obtain or verify the corresponding authorized consumer's personal details 401.

The Transaction Approval Center 104 uses the verified public decryption bio-key 202b to authenticate the digital signature 205 included in the purchase data bundle 305. Authentication of the digital signature 205 biometrically identifies the authorized consumer 100 as having initiated the product purchase (by confirming that the private encryption bio-key 202a corresponding to the verified public decryption bio-key 202b was used to prepare the digital signature 205), and confirms that the purchase data packet 206 has not been modified since creation of the digital signature 205.

At this point the Transaction Approval Center 104 has the following information:

biometrically verified identity of the authorized consumer 100 who initiated the product purchase;

details of the product purchase;

merchant details.

The Transaction Approval Center 104 then determines whether the proposed product purchase will be allowed to proceed. As mentioned above, the Transaction Approval Center 104 may actually comprise one or more financial institutions that are networked together.

If the Transaction Approval Center 104 determines that the proposed purchase can be allowed to proceed, a sequence of steps will be undertaken to complete the product purchase. In one preferred embodiment this sequence may include the following steps:

The Transaction Approval Center 104 approves the product purchase.

The Transaction Approval Center debits the relevant financial account of the authorized consumer 100.

The Transaction Approval Center 104 transmits confirmation 402 of the purchase approval to the merchant 102, thereby allowing the merchant 102 to complete the sale.

The Transaction Approval Center 104 transmits confirmation 403 of the purchase approval to the authorized consumer's smartphone 101. The authorized consumer 100 then has a complete record of the transaction, including a copy of the purchase data packet 206, purchase data bundle 305, and Transaction Approval Center purchase approval 403.

Figure 4:
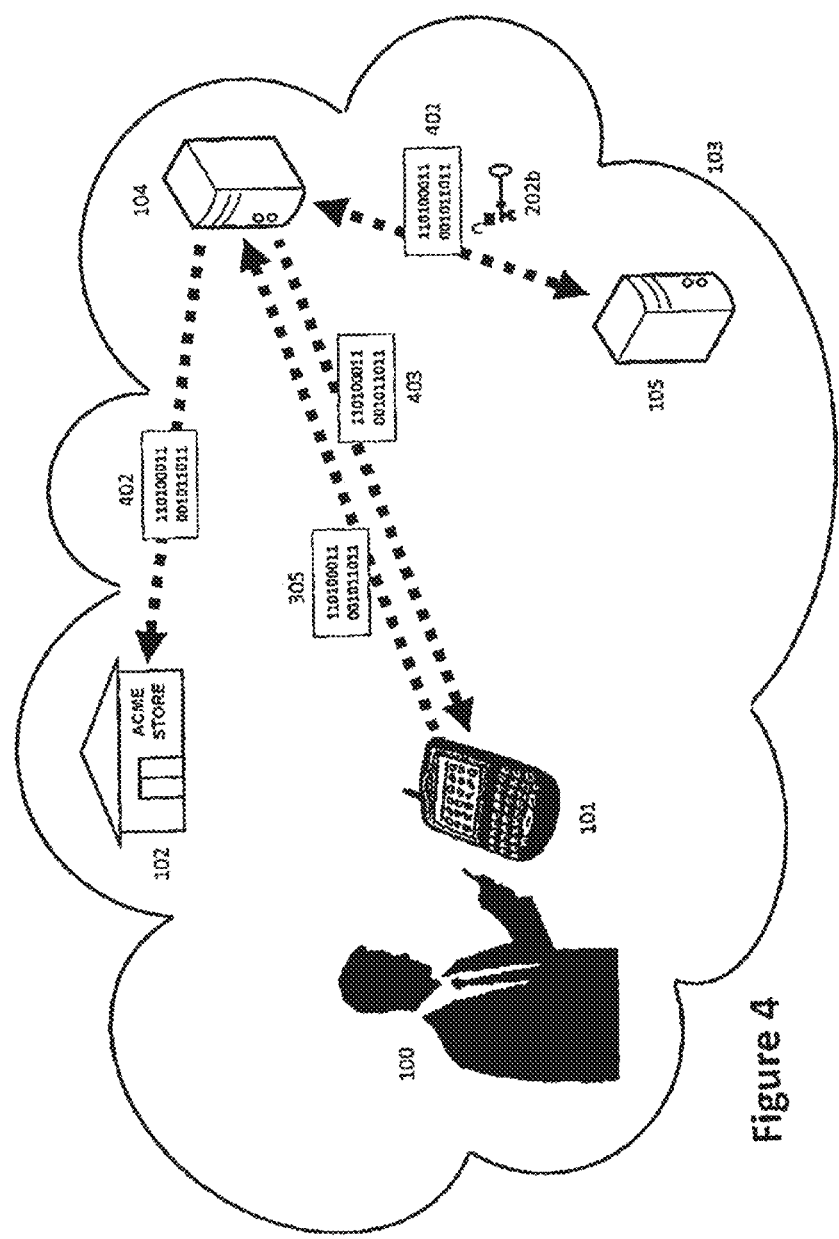
FIG. 4 is a schematic illustration of some of the data exchanges involved in the approval of a biometrically authenticated product purchase request.

Either then or later the Transaction Approval Center 104 credits the merchant account for the sale to the authorized consumer 100 (not shown in FIG. 4).

Data transmission between the Transaction Approval Center 104 and either the merchant 102 or the authorized consumer's smartphone 101 may preferably be secured using existing network security techniques, as described above.

In one preferred embodiment data transmission from the Transaction Approval Center 104 to the smartphone 101 may be secured by means of a public/private key cryptographic method as described in the following and illustrated schematically in FIG. 5. The following description is in terms of the abovedescribed purchase approval confirmation 403, but it should be appreciated that the same technique could be used to in relation to any data transmitted from the Transaction Approval Center 104 to the smartphone 101.

The Transaction Approval Center 104 generates purchase approval confirmation 403 that is to be transmitted to the smartphone 101. It should be appreciated that purchase approval confirmation 403 may include a digital signature (not indicated in FIG. 5) generated using a private encryption key of the Transaction Approval Center 104. In this case said digital signature may be verified by the smartphone 101 using the corresponding public decryption key that may be obtained from a public source such as a digital certificate or a public key server (not necessarily the public key server 105) on the network 103.

Figure 5:
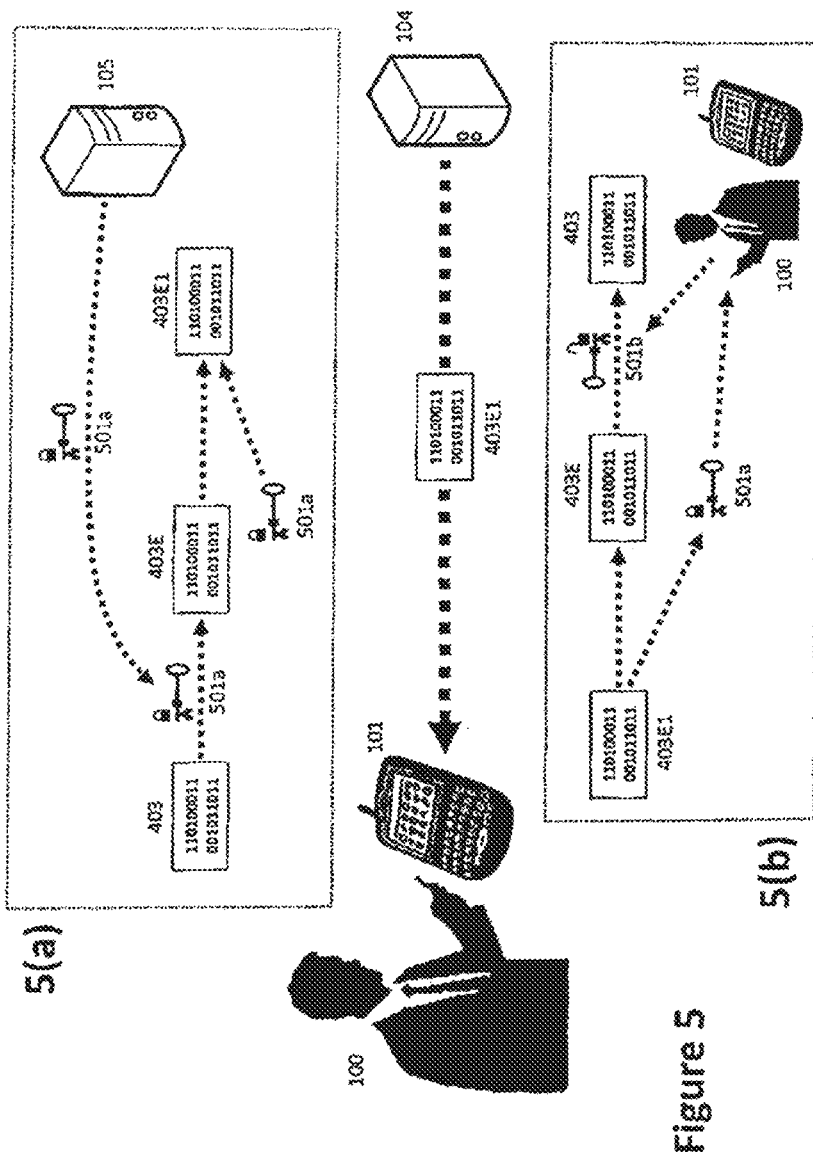
FIGS. 5A and 5B are schematic illustrations of some of the processes involved in securing information that is sent to a consumer's personal device to indicate approval of a biometrically authenticated product purchase request.
Figure 6:
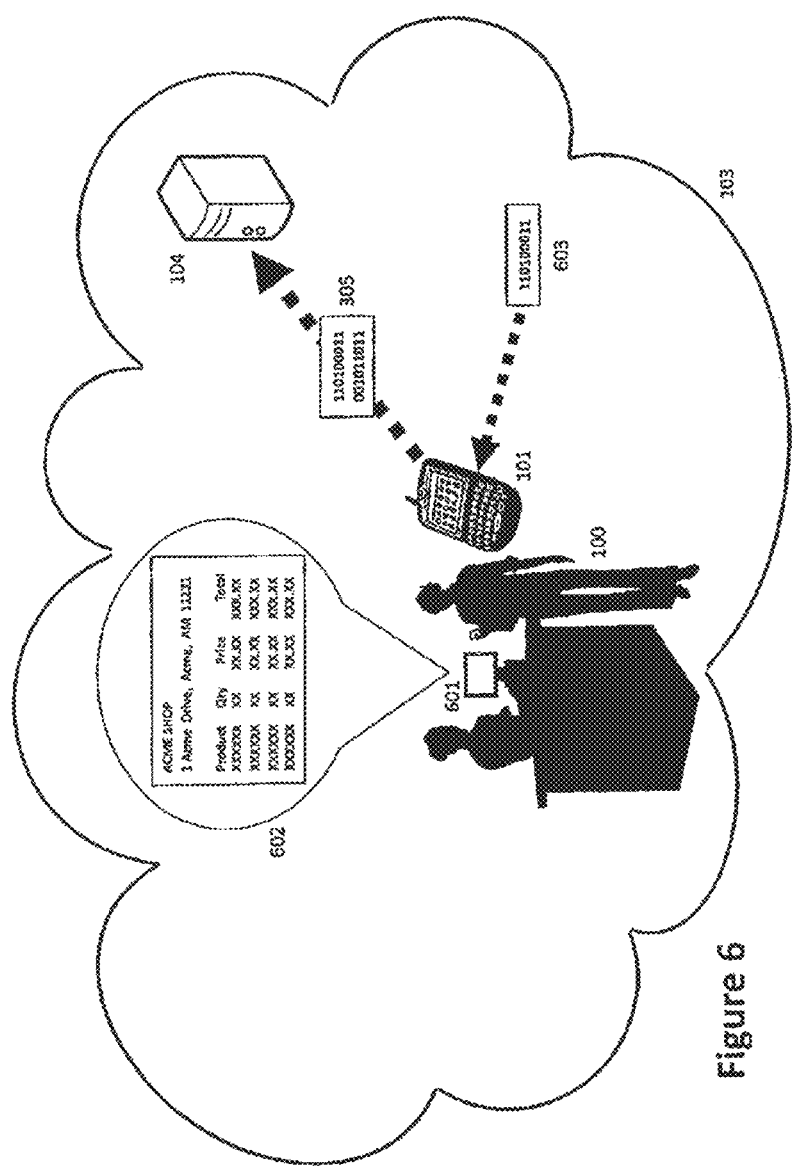
FIG. 6 is a schematic illustration of some of the processes involved in a biometrically authenticated in-store product purchase.

The purchase approval confirmation 403 is encrypted using a public encryption bio-key 501*a*, resulting in the encrypted data 403E—see inset 5(*a*) in FIG. 5. The public encryption bio-key 501*a* is one of a pair of bio-keys, 501*a* and 501*b*, generated by the bio/crypto module 201 and associated with authorized consumer 100. The bio-key 501*b* is the private decryption bio-key corresponding to the public encryption bio-key 501*a*. The public encryption bio-key 501*a* is obtained by the Transaction Approval Center 104 from the public key server 105.

Preferably the public encryption bio-key 501*a* is combined (unencrypted) with the encrypted data 403E, resulting in the data 403E1. The reason for doing this is that it indicates to the bio-crypto module 201 the private decryption bio-key 501*b* that must be used to decrypt the encrypted data 403E, and therefore the authorized consumer 100 for whom the purchase approval confirmation 403 is intended.

The encrypted data 403E1 is transmitted to the smartphone 101 via the network 103.

The purchase approval confirmation 403 is intended for authorized consumer 100 to read and retain in his or her records. To do this the encrypted data 403E must be decrypted using the private decryption bio-key 501*b* corresponding to the public encryption bio-key 501*a*. The private decryption bio-key 501*b* is retained secretly and securely in the bio/crypto module 201 and is disabled in its default state, as described elsewhere herein. Use of the private decryption bio-key 501*b* requires the authorized consumer 100 to provide biometric authorization for a specific cryptographic operation requiring use of the private decryption bio-key 501*b*.

After receiving the data 403E1, the bio-crypto module 201 identifies the authorized consumer 100—by means of the public encryption bio-key 501*a* included with the data 403E1—for whom the purchase approval confirmation 403 is intended, and indicates that biometric authorization is required from authorized consumer 100 in order to read the purchase approval confirmation 403—see inset 5(*b*) of FIG. 5.

Authorized consumer 100 may then or later provide biometric authorization for reading of the purchase approval confirmation 403, which biometric authorization may be provided as described elsewhere herein.

Immediately the authorized consumer 100 provides biometric authorization for the specific cryptographic operation of decrypting the encrypted data 403E, the smartphone 101 gathers live biometric data from the authorized consumer 100 in order to biometrically identify authorized consumer 100.

If biometric identification of authorized consumer 100 is successful, the bio/crypto module 201 enables private decryption bio-key 501*b* only for the purpose of decrypting the data 403E, and for no other purpose—other than for this specific purpose the private decryption bio-key 501*b* remains disabled (see inset 5(*b*) of FIG. 5).

The encrypted data 403E is decrypted by the bio-crypto module 201, thereby generating the unencrypted purchase approval confirmation 403. The purchase approval confirmation 403 may preferably be displayed on the smartphone 101. Preferably the authorized consumer 100 will be provided an option to save the purchase approval confirmation 403 in association with other documents relating to the approved purchase.

It can be seen that the abovedescribed method provides both privacy and security for transmission of the purchase approval confirmation 403, in that the purchase approval confirmation 403 can only be decrypted and read by the authorized consumer 100 who made the purchase. Anyone else receiving the encrypted data 403E will not have access to the private decryption bio-key 501*b*, and therefore will be unable to decrypt the encrypted data 403E.

Specific Preferred Embodiments

Several specific example scenarios will now be described. In each scenario an authorized consumer 100 makes a biometrically authenticated product purchase from a merchant 102 by means of a smartphone 101. As stated elsewhere in this document, it should be appreciated that a smartphone is just one example of a personal electronic device (PED) that a consumer may use to make biometrically authenticated product purchases—other devices that could be used instead include (without limitation) tablets and laptop computers.

The biometric authorization process described in relation to FIGS. 1 to 5 is used in each of the scenarios described below. The primary difference between the scenarios is the way in which the merchant 102 interacts with the authorized consumer's smartphone 101.

Preferred Embodiment 1: Online Purchase

In the first preferred embodiment a consumer 100 purchases products online—i.e. over the internet.

In this embodiment information 204 regarding a proposed product purchase is gathered directly on the consumer's smartphone 101 as the consumer 100 browses a merchant's website. Usually products that are selected for purchase are placed in a "shopping basket" (or similar) on the merchant website and the consumer then goes through the process of completing the purchase.

In a conventional online purchase a consumer would either enter his or her personal information or would log in to a registered area of the merchant website, where the consumer's personal information has already been recorded. In either case, after the consumer's personal information is entered and associated with the proposed purchase, the consumer then usually provides credit card information to complete the purchase.

In the system described herein, the process for completing the proposed purchase involves biometric authorization instead of the use of a credit card, and may in one non-limiting preferred embodiment be as follows.

The consumer 100 reviews the products in the shopping basket on his or her smartphone 101.

The merchant web page preferably includes a means such as an onscreen button—in the case of a smartphone this will likely be a touchscreen button—to biometrically authorize the purchase. The button may, for example, say "Bio-Authorize Purchase" or something similar.

The consumer 100 touches the onscreen button to initiate a biometrically authenticated purchase.

The biometrically authenticated product purchase proceeds as described above in relation to FIGS. 2 to 5. Specifically, the smartphone 101 generates a purchase data bundle 305 for the proposed purchase, and the purchase data bundle 305 is sent via the network 103 to the Transaction Approval Center 104 for processing. Purchase details 301 and merchant details 302 for the purchase data bundle 305 (see FIG. 3 and associated description) are obtained from the merchant's website. For example, purchase details 301 will preferably be obtained from the authorized consumer's "shopping basket" on the merchant website.

If the purchase is successful this will result in a purchase approval confirmation 402 being transmitted from the Transaction Approval Center 104 to the merchant 102 and a purchase approval confirmation 403 being transmitted from the Transaction Approval Center 104 to the authorized consumer's smartphone 101, as described above.

An advantage of the biometric authorization process described herein is that the consumer is not required to enter personal information or a credit card number. Biometric authorization is therefore not only more secure than the current method, since the consumer is identified directly by biometric means rather than indirectly through use of a credit card, but is also faster and easier.

As described elsewhere in this document, in some embodiments the authorized consumer may also be requested to input one or more additional forms of authentication, such as for example a personal identification number and/or a touch-screen swipe pattern, in order for the purchase to proceed.

Preferred Embodiment 2: In-Store Purchase—Consumer Scans Products

In the second preferred embodiment an authorized consumer 100 purchases products in a physical store by browsing through the store and recording information regarding products that he or she intends to purchase. The information is recorded using the authorized consumer's smartphone 101 and appears on the smartphone screen in a "shopping basket", similar in principle to the "shopping basket" (referred to above) in an online shopping experience.

Recording product information may in one embodiment involve reading a tag associated with each product to be purchased—either on the product or on a shelf adjacent to the product. Any of a number of techniques may be used to read said tag and transfer product information to the consumer's smartphone 101. For example, in one embodiment either an optical or radio frequency tag may be read using the smartphone 101, with the tag information then preferably directing the smartphone 101 to a web site with more detailed information regarding the product. The authorized consumer 100 would then have the option of adding the product to a local "shopping basket" on the smartphone 101.

The authorized consumer 100 could then biometrically authorize purchase of the products in the shopping basket via a process similar to that described above for online purchases. If the purchase is successful this will result in a purchase approval confirmation 402 being transmitted from the Transaction Approval Center 104 to the merchant 102 and a purchase approval confirmation 403 being transmitted from the Transaction Approval Center 104 to the authorized consumer's smartphone 101, as described above. The authorized consumer 100 can elect to pick up the purchased products while at the store or have them delivered to an address—either the address associated with the authorized consumer 100 in the public key directory 105 or another address nominated by the authorized consumer 100, said other address in one embodiment also requiring biometric authorization by the authorized consumer 100.

As described elsewhere in this document, in some embodiments the authorized consumer may also be requested to input one or more additional forms of authentication, such as for example a personal identification number and/or a touch-screen swipe pattern, in order for the purchase to proceed.

Preferred Embodiment 3: In-Store Purchase—Products Scanned at Register

In the third preferred embodiment the authorized consumer 100 purchases products in a physical store (the merchant 102) by browsing through the store and collecting products to be purchased. The authorized consumer 100 then moves to a checkout register 601 to finalize the purchase. This embodiment is illustrated schematically in FIG. 6.

The main difference between this embodiment and an online purchase is in the transfer of information regarding the proposed purchase from the checkout register 601 to the consumer's smartphone 101. Once this is done the authorized consumer 100 can biometrically authorize the purchase in essentially the same manner as for an online purchase.

At the checkout register 601 the various products to be purchased are scanned and entered into a proposed purchase record 602 for that sale. Once all products have been scanned the proposed purchase record 602 must be transferred from the checkout register 601 to the authorized consumer's smartphone 101 in order for the authorized consumer 100 to biometrically authorize the purchase.

There are numerous ways to transfer the proposed purchase record 602 to the consumer's smartphone 101.

For example, in some preferred embodiments the proposed purchase record 602 may be transferred directly from the checkout register 601 to the authorized consumer's smartphone 101 via (i) a radio frequency technique such as Bluetooth or wi-fi or (ii) an optical technique such as optical reading by the smartphone 101 of an optical data pattern presented by the checkout register 601.

In other preferred embodiments the internet and/or a cell phone communications network may be used to transfer the proposed purchase record, or information relating to the proposed purchase record, to the authorized consumer's smartphone 101—for example via e-mail or SMS. In these embodiments some identifying information regarding the authorized consumer's smartphone 101 must be available to the checkout register 601 to enable such a transfer.

A preferred embodiment of a method for transferring a proposed purchase record 602 from a checkout register 601 to an authorized consumer's smartphone 101 will now be described by way of non-limiting example. (It should be appreciated that other methods could be used instead.) The method is as follows:

- The authorized consumer 100 selects products to be purchased and presents the products at a checkout register 601.
- The products are scanned at the checkout register 601, thereby generating a proposed purchase record 602.
- The authorized consumer 100 presents an identification card (not shown in FIG. 6) that includes a barcode or 2-dimensional barcode containing messaging information for the authorized consumer's smartphone 101—for example, an e-mail address or the smartphone number. The identification card is scanned at the checkout register 601.
- The checkout register 601 sends a message 603 regarding the proposed purchase record 602 to the authorized consumer's smartphone 101 via a messaging method specified on the authorized consumer's identification card. The message 603 includes an internet address.

The authorized consumer 100 receives and opens the message 603 on the smartphone 101, and then goes to said internet address. (This may be an automated process.) The internet address presents a web page that details the proposed purchase record 602 (including information regarding the merchant 102).

From this point on biometric authorization by the authorized consumer 100 of the proposed purchase and purchase approval by the Transaction Approval Center 104 are essentially as described above in relation to an online purchase and in relation to FIGS. 1 to 5. Specifically, the smartphone 101 generates a purchase data bundle 305 for the proposed purchase, and the purchase data bundle 305 is sent via the network 103 to the Transaction Approval Center 104 for processing. Purchase details 301 and merchant details 302 for the purchase data bundle 305 (see FIG. 3 and associated description) are obtained from the internet address specified in the message 603.

If the purchase is successful this will result in a purchase approval confirmation 402 being transmitted from the Transaction Approval Center 104 to the merchant 102 and a purchase approval confirmation 403 being transmitted from the Transaction Approval Center 104 to the authorized consumer's smartphone 101.

Once the purchase process is complete the merchant 102 releases the purchased products to the authorized consumer 100.

As described elsewhere in this document, in some embodiments the authorized consumer 100 may also be requested to input one or more additional forms of authentication, such as for example a personal identification number and/or a touch-screen swipe pattern, in order for the purchase to proceed.

Other Features and Embodiments

It should be appreciated that numerous variations on, and enhancements to, the biometric authentication system described herein are possible. Some such variations and enhancements are described below by way of non-limiting example.

As described herein, each bio/crypto module 201 generates cryptographic public/private key pairs that are associated with biometric identification of an authorized user 100—the so-called bio-keys. For security reasons these bio-key pairs may be updated by the bio/crypto module 201 either at predetermined times, or at random, or after each use (one-time keys), or at the request of the system (i.e. on demand). As described above, the private bio-keys are retained secretly and securely by the bio/crypto module 201. New public bio-keys will be uploaded to the public key server 105 to replace the current public bio-keys, with the upload preferably being secured by the use of current bio-keys.

A smartphone 101 may be set up for use by more than one authorized consumer 100. In this case the various authorized consumers will each have to enroll in the bio/crypto module 201 on the smartphone 101, which enrollment process includes recording biometric templates in the smartphone's bio/crypto module 201. The smartphone 101 will then operate as described herein for each enrolled authorized consumer 100.

Operation of a Personal Electronic Device (PED)

Figure 8A:
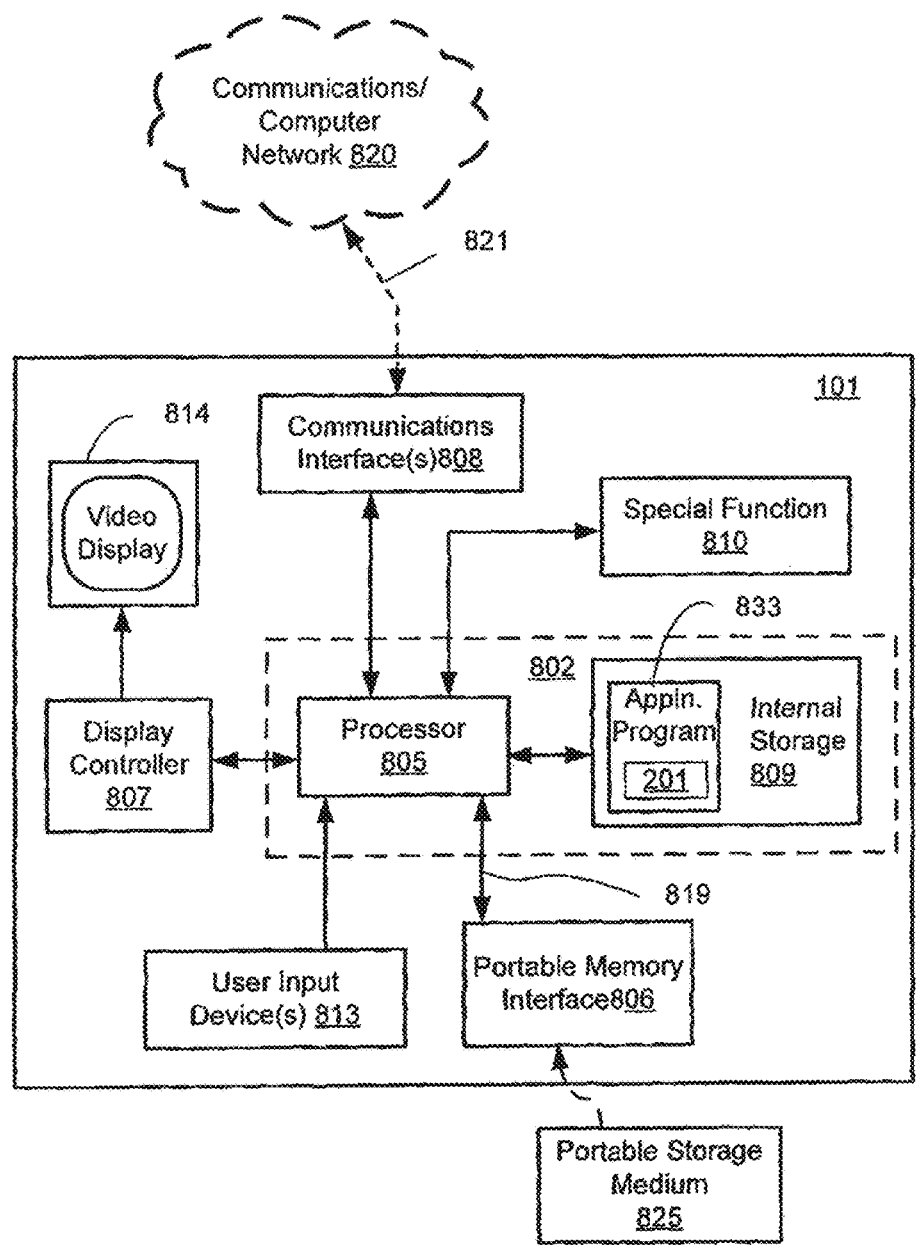
FIGS. 8A and 8B collectively form a schematic block diagram representation of an electronic device upon which described arrangements can be practiced.
Figure 8B:
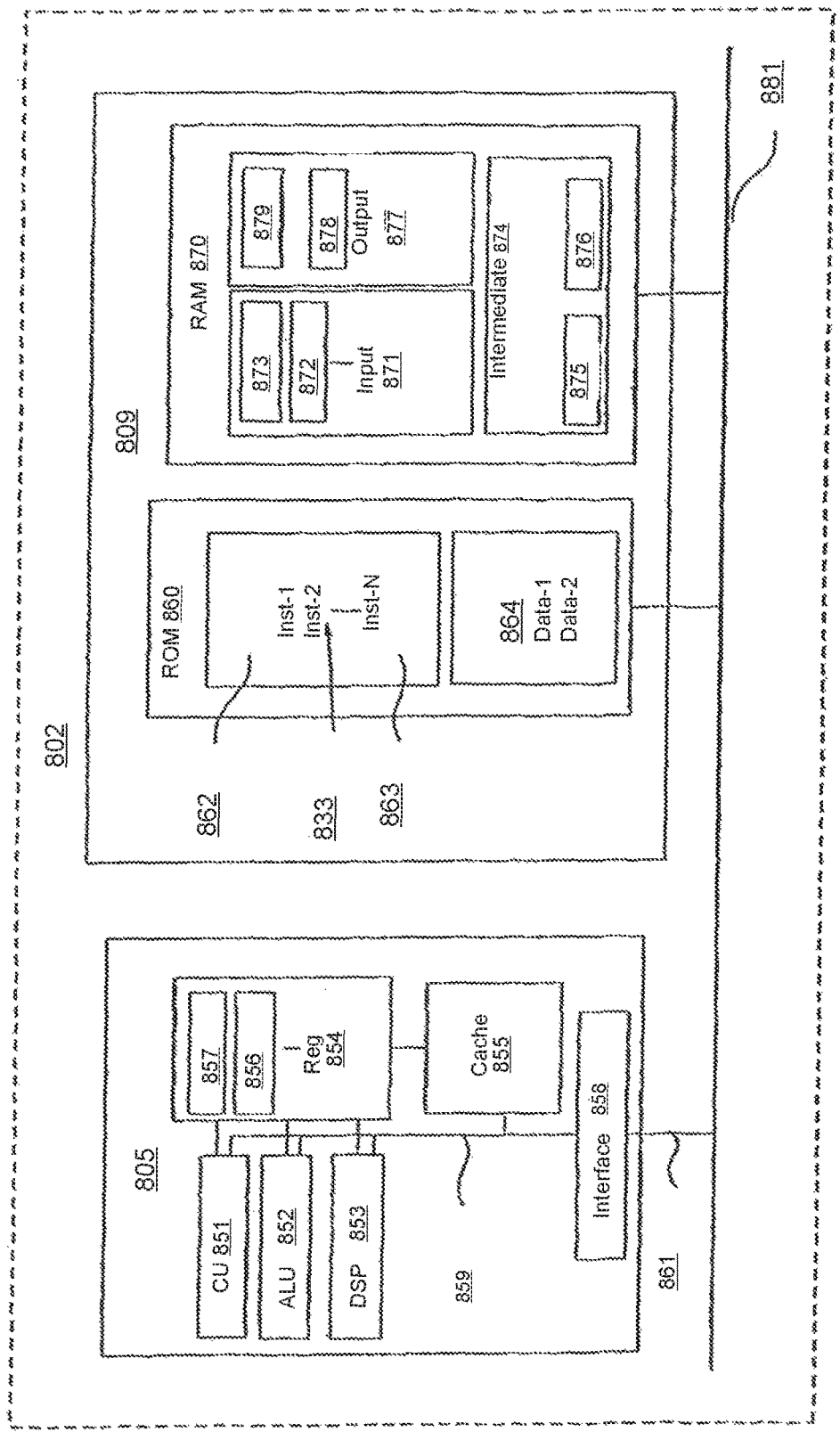

FIGS. 8A and 8B collectively form a schematic block diagram of a general purpose personal electronic device (PED) such as the smartphone 101 including embedded components, upon which the biometric authentication methods described hereinbefore are desirably practiced. As described hereinbefore, the personal electronic device (PED) may also be, for example, a tablet or a laptop device, in which processing resources are limited. Nevertheless, the methods to be described may also be performed on higher-level devices such as desktop computers, server computers, and other such devices with significantly larger processing resources.

As seen in FIG. 8A, the smartphone 101 comprises an embedded controller 802. Accordingly, the smartphone 101 may be referred to as an "embedded device." In the present example, the controller 802 has a processing unit (or processor) 805 which is bi-directionally coupled to an internal storage module 809. The storage module 809 may be formed from non-volatile semiconductor read only memory (ROM) 860 and semiconductor random access memory (RAM) 870, as seen in FIG. 8B. The RAM 870 may be volatile, non-volatile or a combination of volatile and non-volatile memory. The keys 202a and 202b of FIG. 2 may be stored on the module 809.

The smartphone 101 includes a display controller 807, which is connected to a video display 814, such as a liquid crystal display (LCD) panel or the like. The display controller 807 is configured for displaying graphical images on the video display 814 in accordance with instructions received from the embedded controller 802, to which the display controller 807 is connected.

The smartphone 101 also includes user input devices 813 which are typically formed by keys, a keypad or like controls. In some implementations, the user input devices 813 may include a touch sensitive panel physically associated with the display 814 to collectively form a touch-screen. Such a touch-screen may thus operate as one form of graphical user interface (GUI) as opposed to a prompt or menu driven GUI typically used with keypad-display combinations. Other forms of user input device may also be used, such as a microphone (not illustrated) for voice commands or a joystick/thumb wheel (not illustrated) for ease of navigation about menus. The input device 813 provides means for the smartphone 101 to receive transaction information and capture biometric information of a user of the smartphone 101.

As seen in FIG. 8A, the smartphone 101 also comprises a portable memory interface 806, which is coupled to the processor 805 via a connection 819. The portable memory interface 806 allows a complementary portable memory device 825 to be coupled to the smartphone 101 to act as a source or destination of data or to supplement the internal storage module 809. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The smartphone 101 also has a communications interface 808 to permit coupling of the device 101 to a computer or communications network 820 (e.g., the transaction Approval Centre 104) via a connection 821. The connection 821 may be wired or wireless. For example, the connection 821 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like.

Typically, the smartphone 101 is configured to perform some special function. The embedded controller 802, possibly in conjunction with further special function components 810, is provided to perform that special function. For example, the special function component may include (without limitation) means for capturing and using biometric data, means for generating cryptographic key pairs, or means for performing cryptographic operations, as discussed hereinbefore, and/or communications in a cellular telephone environment.

The methods described hereinbefore may be implemented using the embedded controller 802, where the processes of FIGS. 1 to 7 may be implemented as one or more software application programs 833 executable within the embedded controller 802. In particular, the application programs 833 may include the bio/crypto module 201. The smartphone 101 of FIG. 8A implements the described methods of FIGS. 1 to 7. In particular, with reference to FIG. 8B, the steps of the described methods are effected by instructions in the software 833 that are carried out within the controller 802. The software instructions may be formed as one or more code modules, each for performing one or more particular tasks. The software may also be divided into two separate parts, in which a first part and the corresponding code modules performs the described methods and a second part and the corresponding code modules manages a user interface between the first part and the user.

The software 833 of the embedded controller 802 is typically stored in the non-volatile ROM 860 of the internal storage module 809. The software 833 stored in the ROM 860 can be updated when required from a computer readable medium. The software 833 can be loaded into and executed by the processor 805. In some instances, the processor 805 may execute software instructions that are located in RAM 870. Software instructions may be loaded into the RAM 870 by the processor 805 initiating a copy of one or more code modules from ROM 860 into RAM 870. Alternatively, the software instructions of one or more code modules may be pre-installed in a non-volatile region of RAM 870 by a manufacturer. After one or more code modules have been located in RAM 870, the processor 805 may execute software instructions of the one or more code modules.

The application program 833 may be pre-installed and stored in the ROM 860 by a manufacturer, prior to distribution of the smartphone 101. However, in some instances, the application programs 833 may be read by the processor 805 from the network 820, or loaded into the controller 802 or the portable storage medium 825 from other computer readable media. Computer readable storage media refers to any non-transitory tangible storage medium that participates in providing instructions and/or data to the controller 802 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external to the device 101. Examples of transitory or non-tangible computer readable transmission media that may also participate in the provision of software, application programs, instructions and/or data to the device 101 include radio or infra-red transmission channels as well as a network connection to another computer or networked device, and the Internet or Intranets including e-mail transmissions and information recorded on Websites and the like. A computer readable medium having such software or computer program recorded on it is a computer program product.

The second part of the application programs 833 and the corresponding code modules mentioned above may be executed to implement one or more graphical user interfaces (GUIs) to be rendered or otherwise represented upon the display 814 of FIG. 8A. Through manipulation of the user input device 813 (e.g., the keypad or touch screen), a user of the device 101 and the application programs 833 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 8B illustrates in detail the embedded controller 802 having the processor 805 for executing the application programs 833 (including the bio/crypto module 201) and the internal storage 809. The internal storage 809 comprises read only memory (ROM) 860 and random access memory (RAM) 870. The processor 805 is able to execute the application programs 833 stored in one or both of the connected memories 860 and 870. When the smartphone 101 is initially powered up, a system program resident in the ROM 860 is executed. The application program 833 permanently stored in the ROM 860 is sometimes referred to as "firmware". Execution of the firmware by the processor 805 may fulfill various functions, including processor management, memory management, device management, storage management and user interface.

The processor 805 typically includes a number of functional modules including a control unit (CU) 851, an arithmetic logic unit (ALU) 852 and a local or internal memory comprising a set of registers 854 which typically contain atomic data elements 856, 857, along with internal buffer or cache memory 855. One or more internal buses 859 interconnect these functional modules. The processor 805 typically also has one or more interfaces 858 for communicating with external devices via system bus 881, using a connection 861.

The application program 833 includes a sequence of instructions 862 through 863 that may include conditional branch and loop instructions. The program 833 may also include data, which is used in execution of the program 833. This data may be stored as part of the instruction or in a separate location 864 within the ROM 860 or RAM 870.

In general, the processor 805 is given a set of instructions, which are executed therein. This set of instructions may be organized into blocks, which perform specific tasks or handle specific events that occur in the smartphone 101. Typically, the application program 833 waits for events and subsequently executes the block of code associated with that event. Events may be triggered in response to input from a user, via the user input devices 813 of FIG. 8A, as detected by the processor 805. Events may also be triggered in response to other sensors and interfaces in the smartphone 101.

The execution of a set of the instructions may require numeric variables to be read and modified. Such numeric variables are stored in the RAM 870. The disclosed method uses input variables 871 that are stored in known locations 872, 873 in the memory 870. The input variables 871 are processed to produce output variables 877 that are stored in known locations 878, 879 in the memory 870. Intermediate variables 874 may be stored in additional memory locations in locations 875, 876 of the memory 870. Alternatively, some intermediate variables may only exist in the registers 854 of the processor 805.

The execution of a sequence of instructions is achieved in the processor 805 by repeated application of a fetch-execute cycle. The control unit 851 of the processor 805 maintains a register called the program counter, which contains the address in ROM 860 or RAM 870 of the next instruction to be executed. At the start of the fetch execute cycle, the contents of the memory address indexed by the program counter is loaded into the control unit 851. The instruction thus loaded controls the subsequent operation of the processor 805, causing for example, data to be loaded from ROM memory 860 into processor registers 854, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described herein is preferably associated with one or more segments of the application program 833 (such as the bio-crypto module 201), and is preferably performed by repeated execution of a fetch-execute cycle in the processor 805 or similar programmatic operation of other independent processor blocks in the smartphone 101.

The invention claimed is:

1. A method of secure transaction, comprising:
   receiving, by a personal electronic device (PED), transaction information;
   capturing, by the PED, first biometric information from a user;
   identifying, by the PED, if the user is an authorized user of the PED based on the captured first biometric information; and
   if the captured first biometric information identifies an authorized user, performing, by the PED, the steps of:
      enabling a first transaction request cryptographic key stored on the PED, the first transaction request cryptographic key corresponding to the authenticated user;
      generating, using the enabled first transaction request cryptographic key, a digital signature;
      generating and transmitting, via a computer network, a purchase data bundle comprising the received transaction information, the generated digital signature and a second transaction request cryptographic key complementary to the first transaction request cryptographic key;
      receiving, by the PED via the computer network, a purchase approval confirmation comprising a first transaction approval cryptographic key; and
      determining whether the received purchase approval confirmation corresponds to the authenticated user according to the first transaction approval cryptographic key of the received purchase approval confirmation and a second transaction approval cryptographic key stored on the PED, the second transaction approval cryptographic key corresponding to the authenticated user;
   capturing, by the PED, second biometric information;
   performing, by the PED, user authentication based on the captured second biometric information;
   presenting, by the PED, the received confirmation when the first transaction approval cryptographic key is complementary to the second transaction approval cryptographic key and when the user is successfully authenticated based on the captured second biometric information; and
   disabling the first transaction request cryptographic key upon generating the digital signature.

2. The method according to claim 1, wherein the first transaction request cryptographic key, second transaction request cryptographic key and first transaction approval cryptographic key are private, public and public keys, respectively.

3. The method according to claim 1, further comprising capturing and recognizing, using the PED, at least one of voice and gesture inputs, wherein the first biometric information is captured in response to successful recognition of the at least one of the voice and gesture inputs.

4. The method according to claim 1, further comprising capturing, by the PED, non-biometric information comprising at least one of a swipe pattern and a personal identification number, wherein the user authentication is performed further based on the captured non-biometric information.

5. A personal electronic device (PED) comprising:
   a hardware-based processor; and
   a biometric reader, a communication interface and a data storage in operative communication with the hardware-based processor, the data storage comprising instructions executable by the hardware-based processor to:
   receive, via the communication interface, transaction information;
   capture, using the biometric reader, first biometric information of a user;
   if the captured first biometric information identifies an authorized user, perform the steps of:
      enabling a first transaction request cryptographic key stored on the biometric reader, the first transaction request cryptographic key corresponding to the authenticated user;
      generating, using the enabled first transaction request cryptographic key, a digital signature;
      generating and transmitting, via the communication interface, a purchase data bundle comprising the received transaction information, the generated digital signature and a second transaction request cryptographic key complementary to the first transaction request cryptographic key;
      receiving, via the communication interface, a purchase approval confirmation comprising a first transaction approval cryptographic key; and
      determining whether the received purchase approval confirmation corresponds to the authenticated user according to the first transaction approval cryptographic key of the received purchase approval confirmation and a second transaction approval cryptographic key stored on the PED, the second transaction approval cryptographic key corresponding to the authenticated user,
   wherein the PED further comprises at least one of a display and an audible output and the data storage further comprises instructions to:
      capture, using the biometric reader, second biometric information;
      perform user authentication based on the captured second biometric information;
      present, using the at least one of the display and the audible output, the received confirmation when the first transaction approval cryptographic key is complementary to the second transaction approval cryptographic key and when the user is successfully authenticated based on the captured second biometric information; and disable the first transaction request cryptographic key upon generating the digital signature.

6. The PED according to claim 5, wherein the first transaction request cryptographic key, second transaction request cryptographic key and first transaction approval cryptographic key are private, public and public keys, respectively.

7. The PED according to claim 5, further comprising at least one of an audio pickup and a pointer in operative communication with the hardware-based processor, wherein:

the data storage further comprises instructions to capture and recognize at least one of voice and gesture inputs using the at least one of the audio pickup and the pointer; and the first biometric information is captured in response to successful recognition of the at least one of the voice and gesture inputs.

8. The PED according to claim 5, further comprising a user input interface, the wherein the data storage further comprises instructions to:

capture, using the user input interface, non-biometric information comprising at least one of a swipe pattern and a personal identification number, wherein the user authentication is performed further based on the captured non-biometric information.

* * * * *